United States Patent
Lin

(10) Patent No.: US 9,092,131 B2
(45) Date of Patent: Jul. 28, 2015

(54) HIGHLIGHTING OF TAPPABLE WEB PAGE ELEMENTS

(75) Inventor: Jeffrey Tzu-Heng Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 13/324,696

(22) Filed: Dec. 13, 2011

(65) Prior Publication Data

US 2013/0151944 A1 Jun. 13, 2013

(51) Int. Cl.
*G06F 17/00* (2006.01)
*G06F 3/0488* (2013.01)
*G06F 17/30* (2006.01)
*G06F 17/21* (2006.01)

(52) U.S. Cl.
CPC ........ *G06F 3/0488* (2013.01); *G06F 17/30861* (2013.01)

(58) Field of Classification Search
CPC .................................................... G06F 17/211
USPC ........................................................ 715/234
See application file for complete search history.

(56) References Cited

U.S. PATENT DOCUMENTS

| | | | | |
|---|---|---|---|---|
| 4,689,743 A | * | 8/1987 | Chiu | 341/20 |
| 5,384,703 A | * | 1/1995 | Withgott et al. | 715/236 |
| 5,751,906 A | * | 5/1998 | Silverman | 704/260 |
| 7,055,097 B1 | * | 5/2006 | Netsch | 715/207 |
| 7,479,949 B2 | * | 1/2009 | Jobs et al. | 345/173 |
| 7,707,501 B2 | | 4/2010 | Patel | |
| 7,917,846 B2 | | 3/2011 | Decker et al. | |
| 2004/0012627 A1 | | 1/2004 | Zakharia et al. | |
| 2004/0168120 A1 | * | 8/2004 | Scopes | 715/501.1 |
| 2004/0204128 A1 | | 10/2004 | Zakharia et al. | |
| 2004/0207647 A1 | | 10/2004 | Lundin et al. | |
| 2008/0195674 A1 | | 8/2008 | Kim et al. | |
| 2009/0288034 A1 | | 11/2009 | Childress et al. | |
| 2010/0253620 A1 | | 10/2010 | Singhal | |
| 2011/0141031 A1 | * | 6/2011 | McCullough et al. | 345/173 |
| 2012/0197713 A1 | * | 8/2012 | Stroila et al. | 705/14.49 |
| 2012/0216114 A1 | * | 8/2012 | Privault et al. | 715/702 |
| 2013/0002706 A1 | * | 1/2013 | Rezende et al. | 345/619 |
| 2013/0069915 A1 | * | 3/2013 | Kukulj | 345/175 |

OTHER PUBLICATIONS

Gong, et al., "Web Image Indexing by Using Associated Texts", Knowledge and Information Systems, vol. 10, No. 2, 2006, pp. 243-264.

* cited by examiner

*Primary Examiner* — James J Debrow
(74) *Attorney, Agent, or Firm* — Aaron Chatterjee; Kate Drakos; Micky Minhas

(57) ABSTRACT

Methods for highlighting tappable web page elements in response to a touch detect a touch to a touchscreen display, determine that a touched element displayed at the touch location, and determine whether and how the touched element is to be highlighted. Highlighting can be based on various touched element properties. In one embodiment, if a touched element is not tappable, the element is not highlighted. If the touched element is editable, the element is highlighted. A region around the touch location is highlighted if the touched element is an image map or SVG element and a portion of the element at the touch location is tappable. A touched element is also highlighted if the element has an inline display style or is a highlight element type. The touched element is not highlighted if its size and complexity exceed size and complexity thresholds.

21 Claims, 10 Drawing Sheets

```
HighlightType DetermineHighlightTypeFromElement(Element touched_element)
{
    if (touched_element is not tappable)
    {
        return NO_HIGHLIGHT;                                              } 510
    }
    if (touched_element is editable)
    {
        return HIGHLIGHT_ELEMENT;                                         } 520
    }
    else if (touched_element is an image map, SVG, or Canvas element)
    {
        return HIGHLIGHT_POINT;                                           } 530
    }
    else if (touched_element has a inline display style OR
        touched_element is a highlight element type)
    {
        return HIGHLIGHT_ELEMENT;                                         } 540
    }
    else if (the size of the touched_element is over the size threshold AND
        the touched_element is over the complexity threshold)
    {
        return NO_HIGHLIGHT;                                              } 550
    }
    else
    {
        return HIGHLIGHT_ELEMENT;                                         } 560
    }
}
```

FIG. 5

```
<html>
...
<body>
...
<div style="text-align:left">
...
<a href = "http://www.samplepage.com/article1/related_article_1">Link to first related article</a>
<a href = "http://www.samplepage.com/article1/related_article_2">Link to second related article</a>
<a href = "http://www.samplepage.com/article1/comments">Link to reader comments</a>
...
</div>
...
</body>
...
</html>
```

FIG. 6

HIGHLIGHTING OF TAPPABLE WEB PAGE ELEMENTS

BACKGROUND

Web pages contain web page elements, which come in an array of types and allow a broad range of content to be displayed in a web browser in wide variety of styles and formats. Web page elements can be associated with actions that are taken when certain events occur on the web page, such as when a user taps on a displayed element with his or her finger or clicks on an element with a mouse. In some devices with touchscreen displays, if a user touches an element that has action assigned to it, the device highlights the touched element before the action is taken to provide the user with visual feedback on his or her element selection.

SUMMARY

This Summary is provided to introduce a selection of concepts, in a simplified form, that are further described hereafter in the Detailed Description. This Summary is not intended to identify key features or essential features of the claimed subject matter nor is it intended to be used to limit the scope of the claimed subject matter.

Techniques for highlighting web page elements are disclosed that improve the user experience by reducing superfluous highlighting that can occur when a user taps or touches an element on a touchscreen display. In particular, the highlighting techniques consider various properties of the touched element in determining whether to highlight and how to highlight the element.

In one embodiment, the highlighting of a touched element is based on the element type. For example, if a user touches an image map element, rather than highlighting the entire image, a region around the touch location is highlighted, if the region has an event handler assigned to it that reacts to a touch.

In another embodiment, the highlighting of a touched element is based on element size and complexity. For example, if the height and width of the touched element is greater than height and width thresholds, and the complexity of the touched element (which can be the number of characters and tags in the element) exceeds a complexity threshold, then the element is not highlighted.

The foregoing and other objects, features and advantages of the invention will become more apparent from the following detailed description, which proceeds with reference to the accompanying figures.

BRIEF DESCRIPTION OF THE DRAWINGS

FIG. 5 is pseudocode for determining whether and how a touched element is to be highlighted.

FIG. 6 is a portion of an exemplary web page containing three anchor elements.

DETAILED DESCRIPTION

The tools and techniques provided herein provide for the highlighting of tappable web page elements displayed on a touchscreen display, in response to a touch to the touchscreen display. By considering various properties of a touched element in determining whether to highlight the element and how the element is to be highlighted, superfluous highlighting can be reduced, which can lead to an improved user experience.

Figure 1:
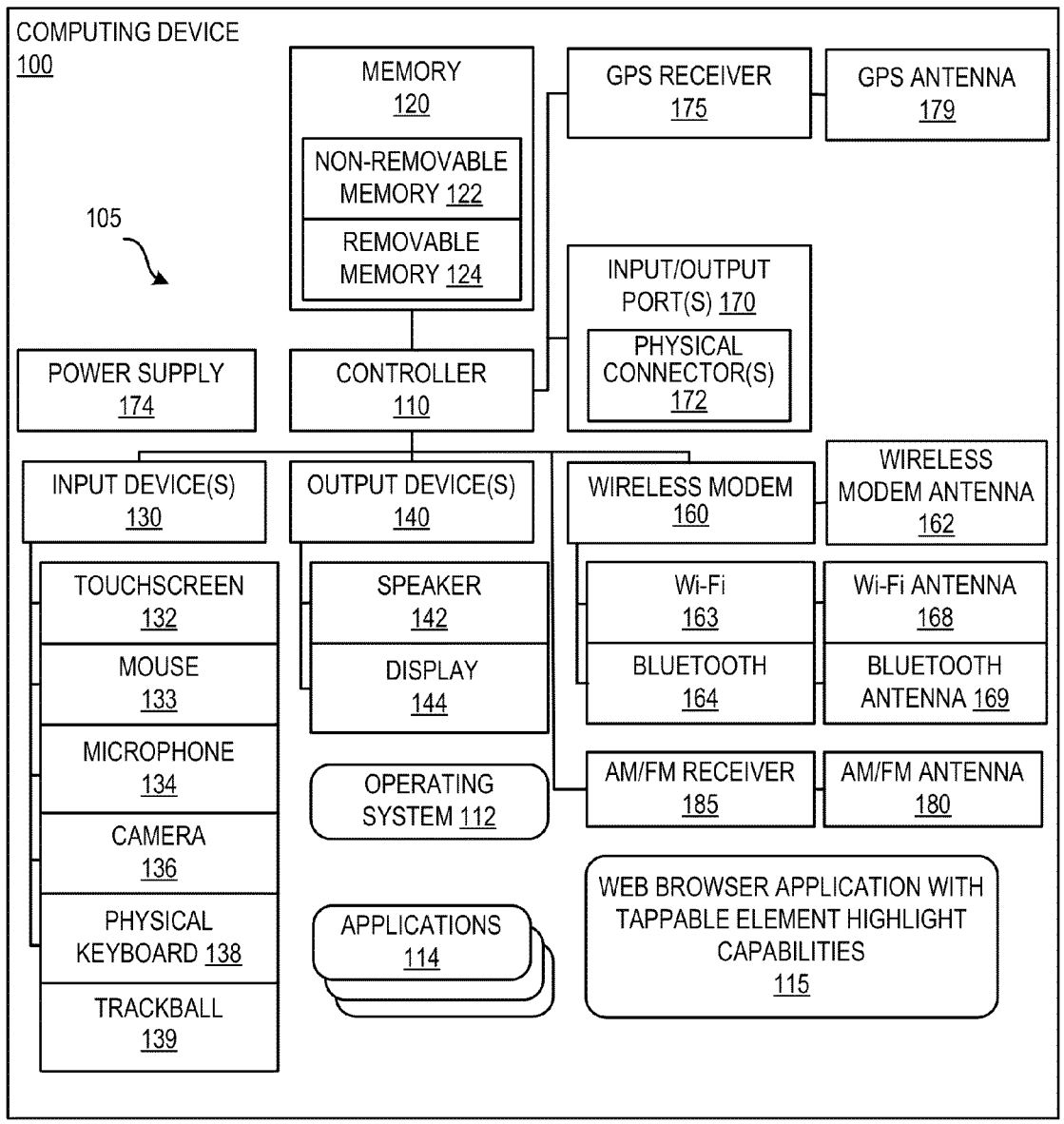
FIG. 1 is a system diagram depicting an exemplary computing device.

FIG. 1 is a system diagram depicting an exemplary computing device 100 that can be used to perform any of the methods described herein. The computing device 100 can include a variety of optional hardware and software components 105. Generally, components 105 can communicate with other components, although not all connections are shown, for ease of illustration. The computing device 100 can be any of a variety of mobile computing devices (e.g., cell phone, smartphone, handheld computer, laptop computer, notebook computer, tablet device, slate device, media player, Personal Digital Assistant (PDA)) and non-mobile computing devices (e.g., desktop computers, servers, gaming consoles, smart televisions). The computing device 100 can allow wired or wireless communication with one or more networks, such as a Wi-Fi, cellular or satellite network.

The computing device 100 can include a controller or processor 110 (e.g., signal processor, graphics processing unit (GPU), microprocessor, ASIC, or other control and processing logic circuitry or software) for performing such tasks as signal coding, graphics processing, data processing, input/output processing, power control, and/or other functions. An operating system 112 can control the allocation and usage of the components 105 and support for one or more application programs 114. The application programs 114 can include common mobile computing applications such as a web browser application 115 configured to perform any of the highlighting methods described herein, and other computing applications (e.g., email applications, calendars, contact managers, messaging applications).

The computing device 100 can include memory 120. Memory 120 can include non-removable memory 122 and removable memory 124. The non-removable, or embedded memory, 122 can include RAM, ROM, flash memory, a hard drive, or other well-known memory storage technologies. The removable memory 124 can include flash memory cards (e.g., SD (Secure Digital) cards), memory sticks, Subscriber Identity Module (SIM) cards, which are well known in GSM (Global System for Mobile Communication) systems, or other well-known memory storage technologies, such as "smart cards." The memory 120 can be used for storing data and/or computer-executable instructions for running the operating system 112 and the application programs 114 and 115 on the device 100. Example data can include web pages, text, images, sound files, video data or other data sets to be sent to and/or received from one or more network servers or other devices by the computing device 100 via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The computing device 100 can also have access to external memory (not shown) such as external hard drives.

The computing device 100 can support one or more input devices 130, such as a touchscreen display 132, mouse 133, microphone(s) 134, camera(s) 136, physical keyboard 138, trackball 139 and pen input device; and one or more output devices 140, such as a speaker(s) 142 and a display 144. Other possible output devices (not shown) can include piezoelectric or other haptic output devices. Any of the input devices 130 and output devices 140 can be internal to, external to, or removably attachable with the computing device 100. External input and output devices 130 and 140 can communicate with the computing device 100 via a wired or wireless connection. Some devices can serve more than one input/output function. For example, touchscreen 132 and display 144 can be combined in a single touchscreen display input/output device.

A wireless modem 160 can be coupled to a wireless modem antenna 162 and can support two-way communications between the computing device 100 and external devices, as is well understood in the art. The modem 160 and the antenna 162 are shown generically and can be a wireless cellular modem for communicating with a mobile cellular communication network. The wireless modem 160 can comprise other radio-based modems such as a Wi-Fi modem 163 or a Bluetooth modem 164, each of which can be coupled to its own antenna (e.g., Wi-Fi antenna 168, Bluetooth antenna 169). The wireless modem 160 is typically configured for communication with one or more cellular networks, such as a GSM network for data and voice communications within a single cellular network, between cellular networks, or between the computing device and a public switched telephone network (PSTN).

The computing device 100 can further include at least one input/output port 170 (which can be, for example, a USB port, IEEE 1394 (FireWire) port, and/or RS-232 port) comprising physical connectors 172, a power supply 174, and a satellite navigation system receiver such as a GPS receiver 175. The GPS receiver 175 can be coupled to a GPS antenna 179.

Figure 2:
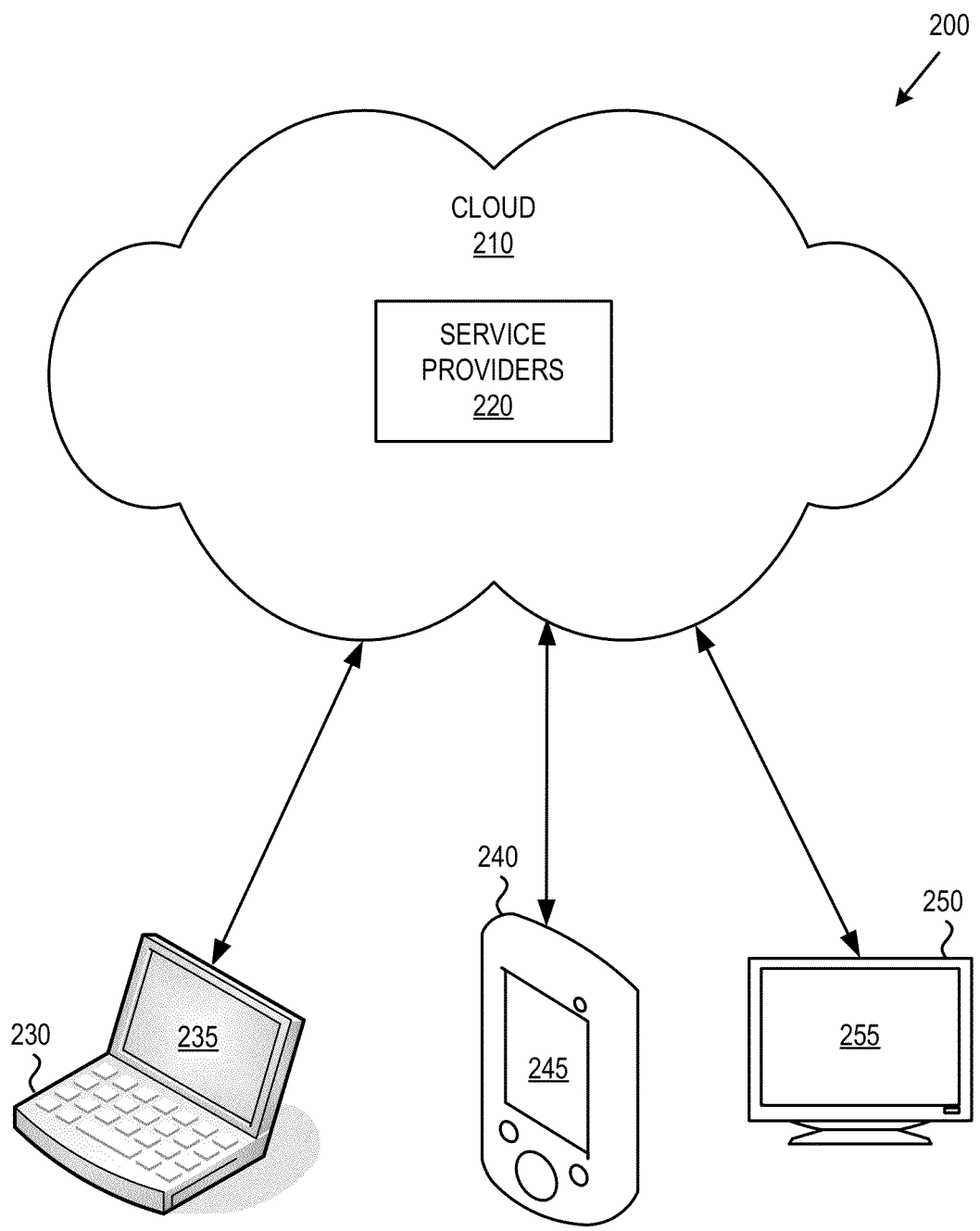
FIG. 2 illustrates a generalized example of a suitable implementation environment in which described embodiments, techniques, and technologies may be implemented.

FIG. 2 illustrates a generalized example of a suitable implementation environment 200 in which described embodiments, techniques, and technologies may be implemented. In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks. For example, some tasks (e.g., processing user input, presenting a user interface, determining if and how web page elements are to be highlighted) can be performed on local computing devices (e.g., connected devices 230, 240, 250) while other tasks (e.g., storage of data to be used in subsequent processing) can be performed in the cloud 210.

In example environment 200, the cloud 210 provides services for connected devices 230, 240, 250 with a variety of screen capabilities. Connected device 230 represents a device with a computer screen (e.g., a mid-size screen 235). For example, connected device 230 could be a server, desktop, laptop, notebook, netbook, tablet computer or the like. Connected device 240 represents a computing device with a computing device screen 245 (e.g., a small-size screen). For example, connected device 240 could be a mobile computing device such as a mobile phone, smart phone, personal digital assistant or the like. Connected device 250 represents a device with a large screen 255. For example, connected device 250 could be a television with Internet connectivity, or a television connected to another device capable of connecting to the cloud such as a set-top box, gaming console or the like. Devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touchscreen display capability of a particular connected device (e.g., connected devices 230, 240, 250). Services that can be provided by the service providers 220 include, for example, email, Short Message Service (SMS), Multimedia Message Service (MMS), social networking and website hosting. The service providers can host online marketplaces offering wide varieties of goods and services such as software applications (e.g., web browser applications) and upgrades and media content which can be obtained by users with or without purchase and for download from the cloud or delivery through postal mail.

In example environment 200, the cloud 210 provides at least in part the technologies and solutions described herein to the various connected devices 230, 240, 250 using, at least in part, the service providers 220. For example, the service providers 220 can provide a centralized solution for various cloud-based services. The service providers 220 can manage service subscriptions for users and devices (e.g., for the connected devices 230, 240, 250 and their respective users).

Figure 3:
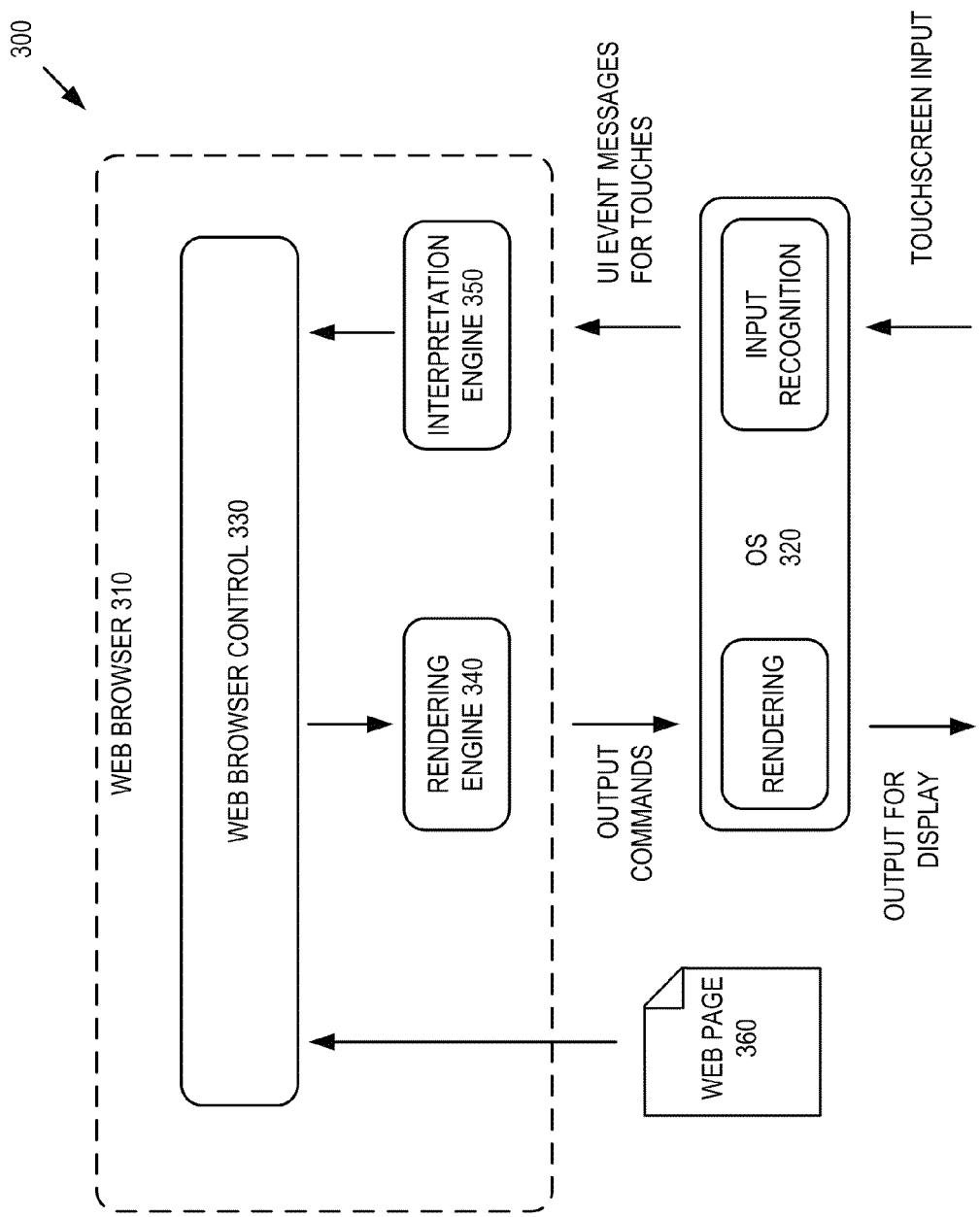
FIG. 3 is a block diagram illustrating an exemplary web browser software architecture.

FIG. 3 is a block diagram illustrating an exemplary software architecture 300 of a computing device capable of highlighting tappable web page elements displayed on a touchscreen display of a computing device. A computing device can execute software organized according to the architecture 300 to display a web page and highlight tappable web page elements in response to a touch at a touchscreen display according to the technologies described herein.

The architecture 300 comprises a web browser application (web browser) 310 and a computing device operating system (OS) 320. In FIG. 3, the device OS 320 includes components for rendering (e.g., rendering a web page to a device display) and components for input recognition. The device OS 320 manages user input functions, output functions, storage access functions, network communication functions, and other functions for the computing device. The device OS 320 provides access to such functions to the web browser application 310.

The web browser 310 comprises a web browser control 330 component, a rendering engine 340 and an interpretation engine 350. The web browser control 330 interprets a web page 360 and generates commands for use by the rendering engine 340 to render a view of the web page. In general, the rendering engine 340 provides output commands for the rendered view to the device OS 320 for output on a display, such as a touchscreen display.

A user can generate user input that affects the display of a web page. The user input can be tactile input such as touchscreen display inputs. The device OS 320 includes functionality for recognizing taps, touches and gestures to a touchscreen display from tactile input, and creating messages that can be used by the web browser application 310 or other software. The interpretation engine 350 of the web browser 310 listens for user input (UI) event messages from the device OS 320. The UI event messages can indicate a tap or touch on the touchscreen display, the location of the touch on the touchscreen display (a touch location), a gesture, or other UI event. One example of user input that affects the display of a web page is a user touching or tapping on a hyperlink (i.e., a web page element that causes another web page, document or other information resource to be displayed). The web page display can be affected by highlighting the touched hyperlink in response to the touch. The hyperlink can be highlighted while a finger is in contact with the touchscreen display, until the finger is determined to be no longer in contact with the touchscreen display or the finger has moved to a position outside the area where the highlighted element is displayed.

Alternatively, the web browser 310 includes more or fewer modules. A given module can be split into multiple modules, or different modules can be combined. For example, the web browser control 330 can be combined with the interpretation engine 350 and/or the rendering engine 340, or the rendering engine 340 and/or interpretation engine 350 can be part of the device OS 320. Functionality described with reference to one module (e.g., rendering functionality) can in some cases be implemented as part of another module.

A web page 360 is a file comprising content and code that a web browser interprets to generate commands that the device OS 320 can use to render a view of a web page on a device display. As used herein, the term "web page" can refer to either a web page file (e.g., web page 360) or the content presented at a device display generated from a web page file. A web page 360 is typically written in a markup language such as HyperText Markup Language (HTML), Extensible Markup Language (XML) or eXtensible HTML (XTML) based language. A web page typically comprises multiple elements that can be arranged hierarchically. Web page elements can comprise a wide variety of displayable content including text, images, audio and video. Displayed content can be interactive, such as buttons, fillable forms and hyperlinks that route a user to another web page. Web page contents that are not displayed include link destinations, metadata and other information that controls how displayable content is displayed, such as element attributes, style information and scripts. Elements can inherit properties of ancestor elements. For example, a child element can inherit display properties or event handlers of a parent element. As used herein, the term "element" or "web page element" refers to either an element in a web page file (i.e., anchor elements 640, 650 and 660 in FIG. 6) or an element presented at a display (i.e., elements 440, 450 and 460 displayed on touchscreen display 420 in FIG. 4).

Event handlers can be attached to web page elements and cause specified actions to occur in response to a specified event occurring at the web page. For example, an event handler can specify that a JavaScript (a set of instructions written in the JavaScript scripting language that is interpretable by the web browser) is to be executed when a user taps on an element to which the event handler is attached. Events to which event handlers can be associated include a mouse button being pressed, a mouse button being released, an image loading, selecting an input field in a form, submitting a form, etc. In certain versions of HTML (e.g., HTML4), these events are specified by event handler attributes such as onclick (single mouse click), ondblclick (mouse click), onmousedown (mouse button is pressed), onmouseup (mouse button is released) and the like.

Although some event attributes are designated with reference to a mouse click (i.e., onclick), an interpretation engine 350 in a computing device (e.g., the input recognition element of the OS 320 and/or the interpretation engine 350 of the web browser in FIG. 3) can recognize a touch event as a mouse event. Thus, a tap can be interpreted as a mouse click, a double tap as a double mouse click, a touch to the touchscreen display as a mouse button being pressed, and the release of a touching object from the touchscreen display surface as being an onmouseup event and so on. In addition, some HTML standards support touch events in addition to mouse events, such as touchstart (finger is placed on a touchscreen display), touchend (finger is removed from a touchscreen display), touchmove (a finger already placed on the touchscreen display is moved across the display), touchenter/touchleave (a touch point moves onto/off an interactive area of a displayed web page).

As used herein, the terms "touch" and "tap" refer to distinct concepts. A touch refers to a touching object, such as a finger or stylus, coming in contact with a touchscreen display surface, and a tap refers to the sequence of a touching object coming in contact with a touchscreen display and then that contact being broken (i.e., the touching object being removed from the touchscreen display). It is to be understood that reference to a specific touching object encompasses other touching objects. Thus, reference to a finger touching a touchscreen display encompasses a stylus or any other touching object touching a touchscreen display.

As used herein, the term "tappable element" refers to an element that has an associated action that is initiated in response to a touch-related or mouse-related event. Thus, tappable elements include clickable elements. An element can be a tappable element because it is intrinsically tappable (i.e., the element is tappable due to its type (e.g., <a>, <button> and <input> elements), has a touch event handler or a mouse event handler associated with it, or because one of its ancestor elements is tappable. A touch event handler is an event handler that responds to a touch-related event, such as a finger touching a touchscreen display, a finger being removed from a touchscreen display, a tap or a double tap. A mouse event handler is an event handler that responds to mouse-related events, such as a mouse button being pressed, a mouse button being released, a mouse click or a mouse double click.

The fact that elements are tappable if one of their ancestor elements is tappable means that, for example, if a root element of a web page has a touch event handler attached to it (a common situation in web pages that attempt to perform their own event dispatching), the root element and its descendant elements are tappable. This means that in some cases, a tap on an element could result in a large region of a displayed web page being highlighted, resulting in an unpleasant user experience.

One exemplary utility of highlighting tappable web page elements is that it provides a user with visual feedback indicating which element a device has determined a user to have actually touched. This feedback can be of particular use in mobile computing devices that have relatively small displays, such as smartphones, and where the size of displayed elements can be small relative to the area of a user's fingertip that contacts a touchscreen display when a user taps or touches a display.

For example, consider a smartphone displaying a web page of a newspaper that contains hyperlinks to individual articles, graphics and reader comments. It is not unusual for some of these hyperlinks to be displayed in the smartphone display in small font size and in close proximity to other links, such that a tap to one hyperlink could be interpreted by the device to a tap to a neighboring link. By highlighting the hyperlink that the device determines the user to have touched, the user is provided with visual feedback letting him or her know whether the device captured the user's intention. Typically, this feedback can be provided while a finger is still in contact with the touchscreen display. If the user determines that the incorrect hyperlink has been touched, the user can move his or her finger off the highlighted element to avoid the device loading the linked page. For example, the user can rock his or her fingertip or slide his or her finger in the direction of a neighboring link until the correct element is highlighted.

Although the highlighting of tappable elements is generally described herein in the context of highlighting an element displayed on a touchscreen display, the highlighting technologies can be used to highlight elements selected via a mouse, trackball, mouse pad or other input device. Typically, desktop computer users have more control in selecting web page elements due to desktop computers having display sizes that are larger than mobile device displays and desktop computer input devices, such as a mouse, that provide more precise control in selecting an element relative to a finger touching a touchscreen display. However, a mouse may not provide precise control over element selection in all scenarios. For example, control may be lacking for a laptop computer user using a USB mouse on an uneven or rough surface, or a laptop user using a mouse pad while a passenger in a moving vehicle. Thus, the highlighting technologies described herein can provide useful feedback to users of computing devices that do not have a touchscreen display and that provide selection of web page elements via input devices other than a touchscreen display.

The highlighting technologies disclosed herein provide for the highlighting of touched tappable elements and reduction of superfluous highlighting by considering various element properties such as type, display style, size and complexity.

Figure 4:
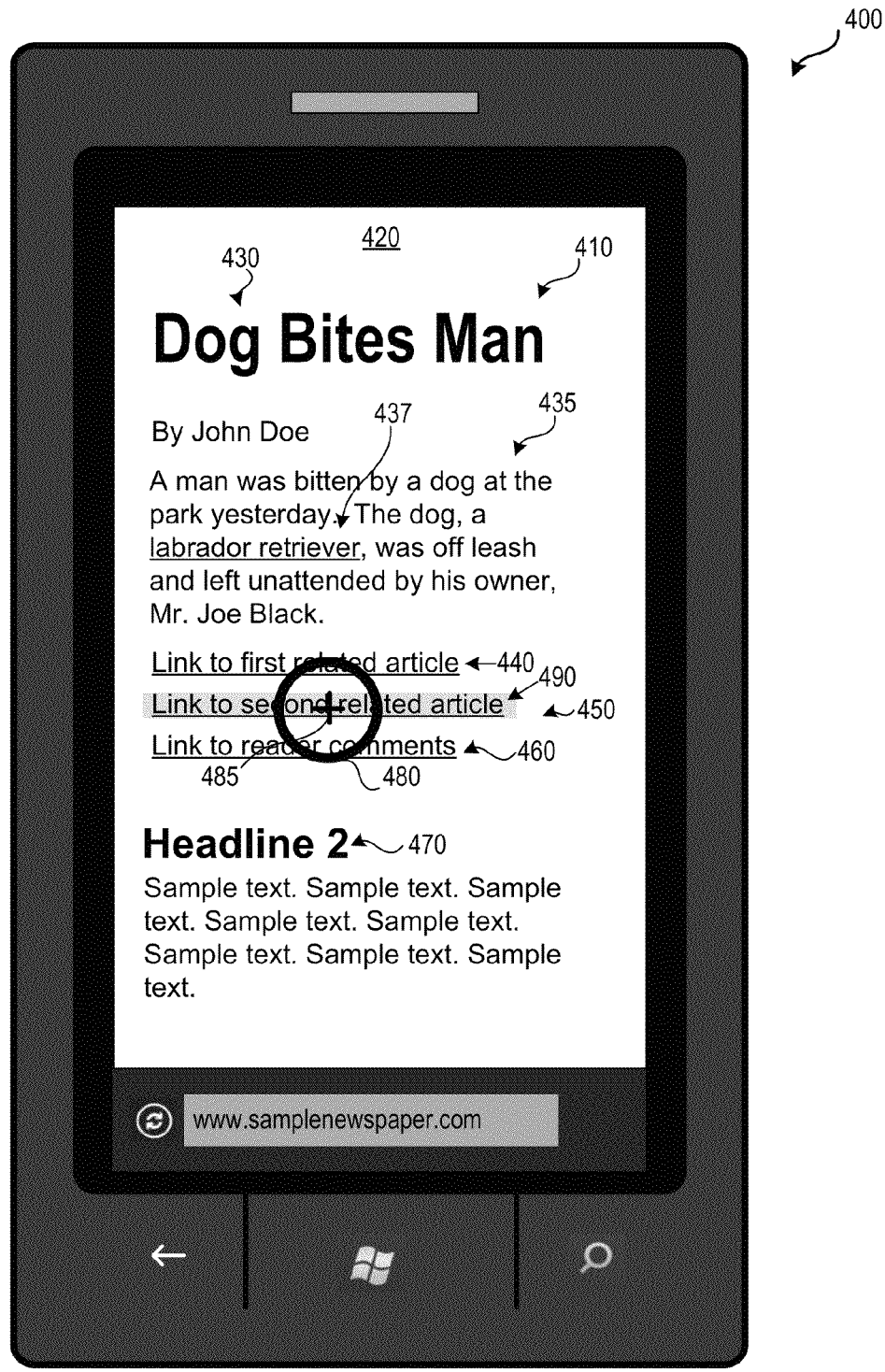
FIG. 4 is a diagram illustrating exemplary highlighting of an anchor element.

FIG. 4 shows an illustration of a smartphone 400, one type of computing device 100, displaying a portion of web page 410 of a newspaper web site (www.samplenewspaper.com) on a touchscreen display 420 of the smartphone 400. The web page 410 comprises a first article with elements 430, 435 and 437 containing an article headline, body, and an inline link, respectively; and elements 440, 450 and 460 containing links to related articles and reader comments. Elements 430, 437, 440, 450 and 460 are tappable elements, clicking on any of them causes the web browser to load another web page. Circle 480 indicates the contact area of a finger touching the display 420. In response to detecting the touch, the smartphone 400 determines a touch location 485, determines that element 450 is the touched element and highlights element 450. As used herein the term "touched element" refers to a web page element displayed at a computing device display at a touch location.

In some embodiments, a web page element can be highlighted by changing the displayed color of the element, such as the highlighted element 450, which is shown with highlighting 490. In other embodiments, a touched element can be displayed with a different color than the color of untouched or unselected text, or displayed as underlined. In various embodiments, highlighting of the element can persist as long a touching object is in contact with the touchscreen display (i.e., the duration of a tap), until a destination web page is loaded, until a script finishes executing, or until another designated event occurs. Thus, if a web page is quickly loaded after a tappable element has been tapped, the highlighting may appear on the touchscreen display for only a moment.

Returning to FIG. 4, if the user intended to select the link to the reader comments (element 460) instead of the second related article (element 450), in response to seeing highlighting 490 appear, the user can rock his finger downward until the touch location 485 moves to the region of the display 420 occupied by element 460. In response, the smartphone 400 can unhighlight element 450 and highlight element 460. Alternatively, the user can swipe his or her finger away from element 450 so that the computing device interprets the tactile input as gesture other than a touch or a tap, thus preventing the computing device from loading the link to the second related article when the user releases his or her finger.

FIG. 5 is pseudocode of an exemplary function 500 for determining whether a touched element of a web page is to be highlighted and, if so, what type of highlighting is to be used to highlight the element. The function 500 is typically part of the web browser control (e.g., web browser control 330 of FIG. 3) of a web browser application. Prior to calling function 500, the web browser determines which element of a displayed web page is to be supplied as the touched_element input parameter to the function 500. As a web page can comprise a hierarchy of elements, it is possible for multiple elements to be displayed at a touch location.

For example, FIG. 6 shows excerpts from an exemplary HTML web page 600 for generating the web page 410 of FIG. 4. Anchor elements 640, 650 and 660, correspond to elements 440, 450 and 460 displayed on the touchscreen display 420 and are contained within a <div> element 610 that specifies text within the <div> element 610 be left-justified. The <div> element 610 in turn is contained within a <body> element 620. Thus, the web page elements that occupy the display 420 at the touch location 485 include elements 650, 610 and 620.

In one embodiment, the web browser can determine which element to pass to the function 500 as the touched_element parameter as follows. When a user touches a web page, the web browser identifies the lowest-level element within the element hierarchy from among the elements that are displayed at the touch location. If this lowest-level element is directly tappable, it is selected as the touched element. If not, the closest ancestor to this lowest-level element that is directly tappable is selected as the touched element. The touched element is then passed to the function 500 as the touched_element parameter. As used herein, the term "directly tappable" refers to an element that is tappable because the element is intrinsically tappable or has a touch event handler attached to it, as opposed to an element being a tappable element because one of its ancestors is tappable.

For example, consider the following markup:

```
<html>
<body>
<div onclick="alert(123);" >
<a href="something.com">
    anchor text <b>bold</b>
</a>
Outside of anchor
</div>
<p>paragraph</p>
</body>
</html>
```

If a user taps on the text "bold," the web browser would select the element surrounded by the <b> font-style tag (the <b> element>) to be the lowest-level element at the touch point. In this case, the <b> element is tappable (as it is a child element of the <a> element), but not directly tappable. Thus, the <b> element is not selected as the touched element. The closest ancestor element of the <b> that is directly tappable is the anchor element surrounded by the <a> tag, which is intrinsically tappable. Thus, the anchor element is selected as the touched element, and passed to the function 500 as the touched_element parameter.

If a user taps on the "Outside of anchor" text, the web browser selects the <div> element to be the touched element, as the <div> element is directly tappable (because it has an attached onclick event). If a user taps on the "paragraph" text, the web browser selects the element surrounded by the <p> tag (the <p> element) to be the lowest level element. In this case, the <p> element is not tappable because it is not directly tappable. None of the <p> element's ancestors is directly tappable. Thus, the web browser can pass either the <p> element or a NULL element to the function 500. Alternatively, the web browser can determine the element to be passed to the function 500 as the touched_element in other manners.

Returning to FIG. 5, the IF block 510 determines whether the touched_element is not tappable. The web browser can determine whether an element is tappable based on, for example, the element type and the presence of a mouse or touch event handler attached to the element. If the touched element is not tappable, the function returns the NO_HIGHLIGHT return code, which indicates that the touched element is not to be highlighted.

If the condition in IF block 510 is not satisfied, the function proceeds to IF block 520, which determines whether the touched element is editable. If so, the function 500 returns the HIGHLIGHT_ELEMENT return code, indicating that the touched element is to be highlighted. An editable element is an element whose content can be edited by a user, or allows a user to generate content (i.e., filling out a form). Some web page elements are intrinsically editable, such as the HTML <input> element, and others can be made editable if the element or one of its ancestor elements is editable, for example, if an ancestor element contains the attribute "contentEditable" set to true. An editable element is considered to also be a tappable element, thus, an editable element will not satisfy the IF block 510. The web browser can determine whether an element is editable by, for example, querying the element. For example, a web browser using the MSHTML rendering engine (the rendering engine used on the Windows® version of Microsoft® Internet Explorer) can query the isContentEditable property of an element object to determine whether an element is editable. Some examples of editable elements include an editable text box and editable fields in email form (i.e., To:, Subject: and email body fields or boxes).

If the touched element is tappable and not editable, the function 500 proceeds to ELSE blocks 530, 540, 550 and 560. ELSE block 530 determines whether the touched element comprises an image map, Scalable Vector Graphics (SVG) or canvas element. If so, the function returns the HIGHLIGHT_POINT return code, indicating that a region local to the touch point is to be highlighted.

Figure 7:
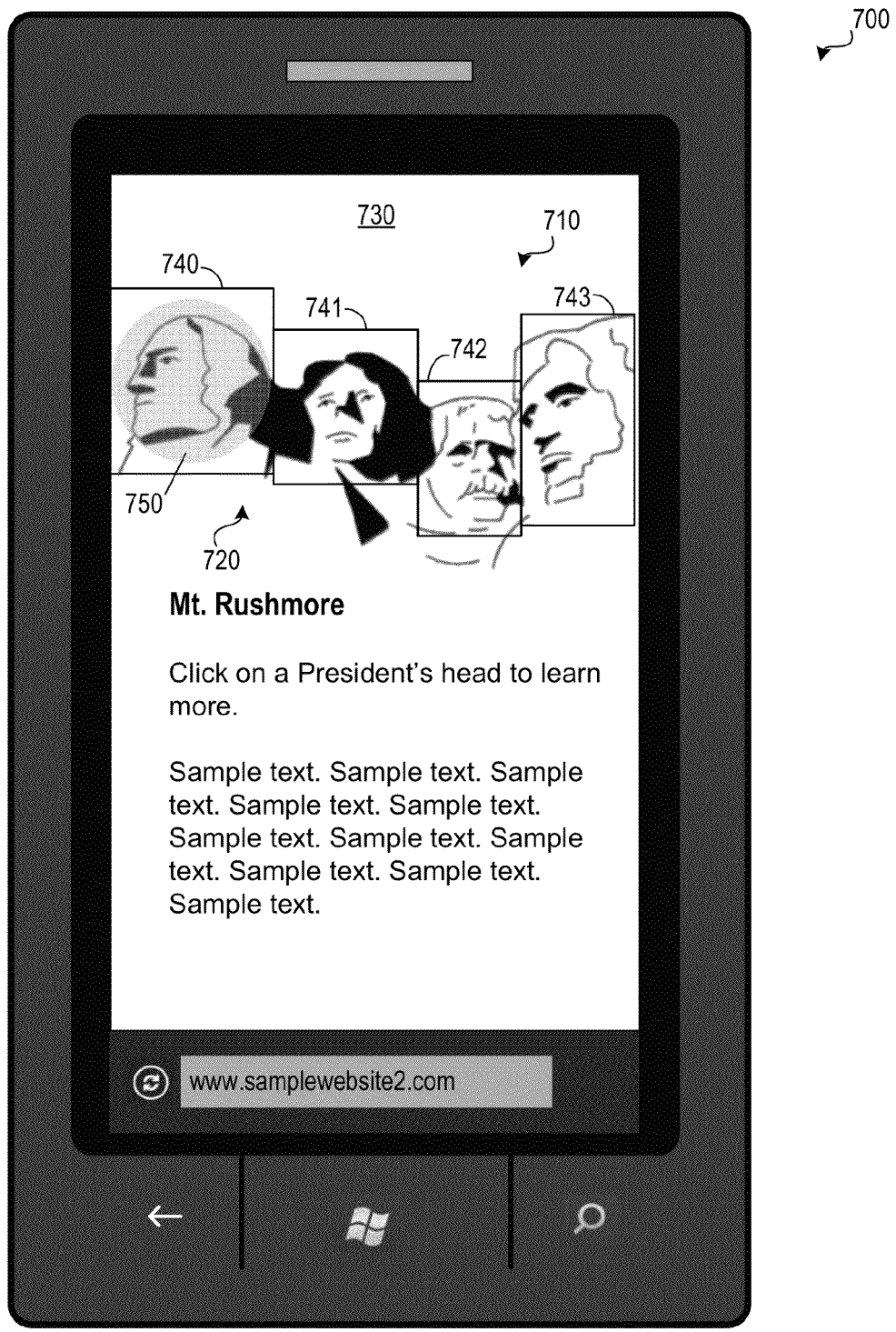
FIG. 7 is a diagram illustrating exemplary highlighting of a region of an image map element.

FIG. 7 is an illustration of a smartphone 700 displaying a web page 710 containing an image 720 of Mt. Rushmore on a touchscreen display 730. The image 720 is part of an image map element that contains four area elements that designate areas 740-743 as tappable. The displayed web page 710 shows a region 750 highlighted in response to a user touching the tappable area 740. The highlighted region 750 is circular, but can be any other shape or size. In some embodiments, the highlighted region can be coincident with a tappable region within an image map element. A highlighted region in an image element can be centered around a touch location, centered within a tappable region, or aligned in another fashion. In various embodiments, a tap to the image outside the tappable regions can result in the image as a whole being highlighted, nothing being highlighting, or another action being taken.

SVG elements also provide the ability to create tappable regions within a graphic element. SVG is a language for describing two-dimensional vector graphics in XML and SVG elements can define vector-based graphics to be included in a web page and provide control over individual components within the SVG element. For example, individual vectors can be modified or transformed, the background can be changed, etc. SVG elements can comprise event handlers that are associated with objects within an SVG element, or with an SVG element itself. Canvas elements allow for dynamic, scriptable rendering of two dimensional shapes or drawings and bitmap images. If a canvas element is tappable (i.e., it has a touch or mouse event handler attached to it), the highlighting of a region around the touch point within a canvas element's display area can provide for a more pleasant experience that highlighting the entire canvas element.

Alternatively, the ELSE block 530 can return the HIGHLIGHT_POINT return code for other element types that comprise an image or code that is used by a web browser to render a drawing or image, and a touch event handler associated with a region of the image, or an object or element within the touched element. The ability to highlight portions of an image, graphic or drawing, can provide for an improved user experience in contexts where highlighting the entire image, graphic or drawing may be distracting. For example, in gaming and other interactive context, highlighting of an individual component of the touched element, such as a game character or item, is likely to be preferred over the highlighting of the touched element, which can create a distracting user experience.

If the condition in the ELSE block 530 is not satisfied, the function proceeds to ELSE block 540, which determines if the touched element has an inline display style or if the touched element type is a highlight element type. If so, the touched element is to be highlighted and the function 500 returns the HIGHLIGHT_ELEMENT return code. An inline display style indicates that the element takes up as much width in the web page as it needs (the element can span multiple lines), and that there will not be a new line before or after the element.

The web browser can look to the display property of an element to determine whether the element has an inline display style. For example, the Cascading Style Sheets (CSS) "display" property can be examined to determine whether an element has an inline display style. CSS is a style sheet language used to describe the style in which a web page is to be presented. A value of "inline" for the CSS display property can indicate that an element is to be displayed inline. Markup languages typically define a default display style for element types, and if an element has no display property specified, the web browser can use the default display style setting for determining whether the condition in ELSE block 540 is met. The web browser can examine the value of an appropriate display property of another style sheet or markup language to determine the display style of an element.

A "highlight element type" is an element type that indicates an element of this type, if touched, will be highlighted. For example, if the <input> element type is designated as a "highlight element type," any <input> element that is passed to the function 500 as the touched_element parameter will be highlighted. A default set of highlight element types can be provided to (or programmed into) a web browser application. The set of highlight element types can be user-configurable. Highlight element types for the HTML language can include the <a>, <input>, <textarea>, <button>, <label>, <select>, <img> (image) and <area> element types. The default list of highlight element types can be updated by, for example, web browser application updates or by new highlight element types for a given markup language being pushed to the web browser application.

If the condition of ELSE block 540 is not satisfied, the function 500 proceeds to ELSE block 550, which determines whether a touched element size exceeds a size threshold and if a touched element complexity exceeds a complexity threshold. If so, the touched element is not to be highlighted and the function 500 returns the NO_HIGHLIGHT return code. Thus, ELSE block 550 places a limit on the size of touched elements that are highlighted. The touched element size can be based on the size of the touched element independent of any magnification factor. Alternatively, the touch element size can take any magnification factor into account.

The touched element size can be based on, for example, the height, width, area or other size metric. Similarly, the size threshold can comprise a height, width or area. In one embodiment, the touched element size comprises the height and width of the touched element, and the size threshold comprises a height of 200 pixels and a width of 200 pixels. The web browser can determine the size of a touched element, for example, by querying the web browser render engine. The size threshold can be fixed or it can be dynamic, depending on display size and/or magnification factor that the web page is displayed at (e.g., a measure of the extent to which a user, an application or the operating system has zoomed in or out of the web page). For example, the size threshold can be larger for devices that have a larger display or if the web page is being displayed at a low magnification factor (i.e., the web page has not been magnified, or magnified to a small degree).

By considering the complexity of a touched element along with the size of the touched element, the web browser can avoid highlighting large and complex elements. In some embodiments, a touched element's complexity is based on the number of characters and tags in the element in the web page file. In one example of determining complexity, each opening and closing tag counts as "1" toward an element's complexity and the characters that comprise tag attributes and tag attribute values are not counted in determining an element's complexity. Each character that is not part of a tag attribute or value can also be counted as "1" toward an element's complexity. For example, the complexity of the element 640 in FIG. 6 could be 31, the 29 characters in the "Link to first related article" text string, the <a href . . . > opening tag, and the </a> closing tag. In some embodiments, the complexity threshold can be a fixed value, such as 500 characters and tags. In other embodiments, the complexity threshold can be dynamic and be based on, for example, display size and display magnification factor. In Microsoft® HTML (MSH-TML), the begin and end positions of a touched element in a web page can be determined by calling the IMarkupPointer2::GetMarkupPosition method, which returns the position of a markup pointer.

If none of the conditions specified in the IF blocks 510 and 520 and ELSE blocks 530, 540 and 550 are met, the function proceeds to ELSE block 560 and returns the HIGHLIGHT_ELEMENT return code.

Alternatively, function 500 possess more or fewer IF and ELSE blocks than those shown in FIG. 5. The order of the IF and ELSE blocks in function 500 is deliberate. For example, by placing the ELSE block 550 after ELSE blocks 530 and 540, a touched element that is an image map, SVG or canvas element, has an inline display style, or is of a highlighting element type, is highlighted regardless of the element's size or complexity. In various embodiments, the ordering of the ELSE blocks 530, 540 or 550 can be different from that shown in FIG. 5, and additional IF and ELSE blocks can be placed at any point in function 500.

The operation of function 500 can be better understood by considering an example. Returning to FIG. 4, in response to a touch to the touchscreen display 420 at touch location 485, touch element 450 is passed to the function 500 as the touched element. Element 450 is an anchor element that includes a link to another page, an article related to the first article displayed on display 420. Neither of the conditions in IF blocks 510 and 520 are satisfied as element 450, is tappable but not editable. ELSE block 530 also is not satisfied as element 450 is not an image map, SVG or canvas element. However, ELSE block 540 is satisfied as the element 450 is an anchor element, a designated highlight element type. The function 500 returns the HIGHLIGHT_ELEMENT return code, and the element 450 is highlighted with highlighting 490, as shown.

Figure 8:
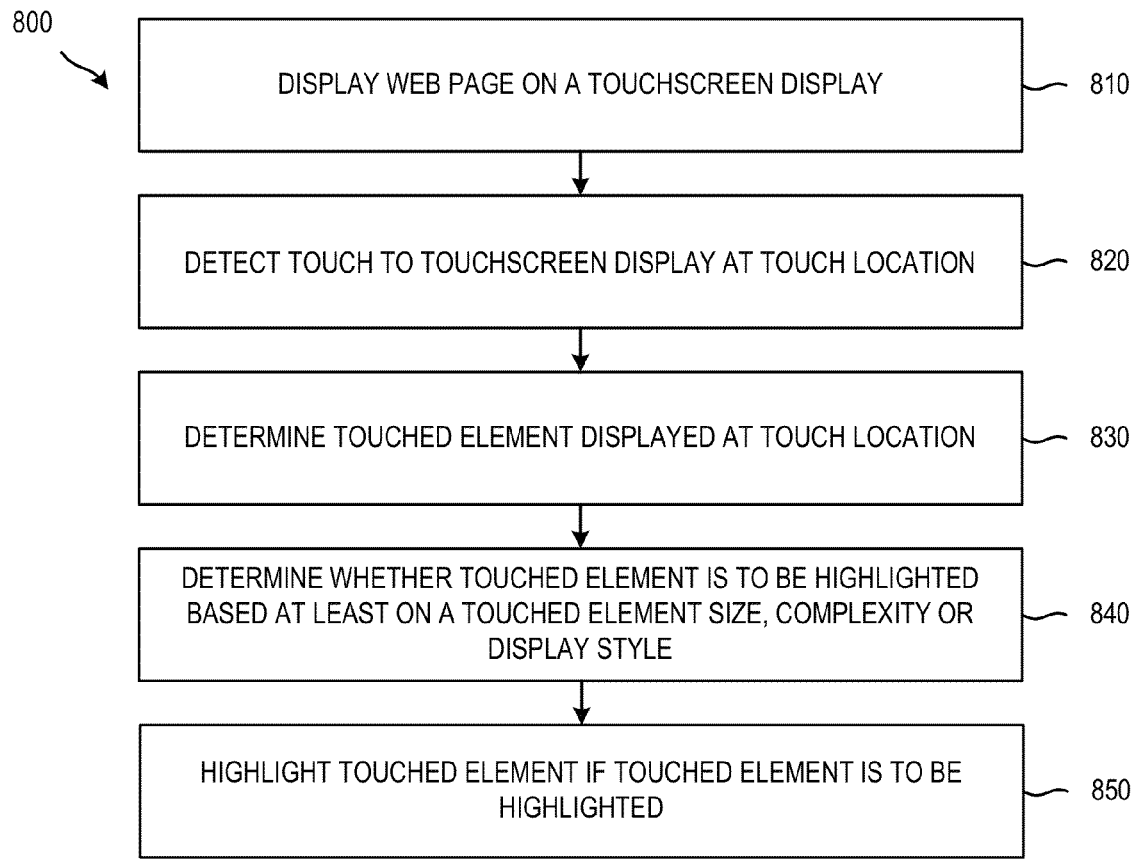
FIG. 8 is a flowchart of a first exemplary method of highlighting tappable web page elements on a touchscreen display.

FIG. 8 is a flowchart of a first exemplary method 800 of highlighting tappable web page elements on a touchscreen display. The method 800 can be performed by a web browser executing on the smartphone 400. At 810, at least a portion of a web page is displayed on the touchscreen display, the web page comprising a plurality of elements. In the example, the smartphone 400 displays the web page 410 on the touchscreen display 420. At 820, a touch to the touchscreen display is detected at a touch location. In the example, a touch to the touchscreen display 420 is detected at a touch location at which the element 437 is displayed. At 830, a touched element from the plurality of elements is determined to be displayed on the touchscreen display at the touch location. In the example, the element 437 is determined to be displayed at the touch location. At 840, it is determined whether the touched element is to be highlighted based at least on a touched element size, a touched element complexity or a touched element display style. In the example, it is determined that the web element 437 is to be highlighted because the touched element display style is inline. At 850, the touched element is highlighted on the touchscreen display if the touched element is to be highlighted. In the example, the web element 437 is highlighted on the touchscreen display 420.

In alternatives to the method 800, the touched element highlighting is based at least on the touched element size and the touched element complexity. The touched element size can comprise a touched element height and/or a touched element width, and the touched element can be left unhighlighted if the touched element size exceeds a size threshold and the touched element complexity exceeds a complexity threshold. In various embodiments, the method 800 can further comprise adjusting the size threshold and/or the complexity threshold in response to a change in the magnification factor of the web page.

Figure 9:
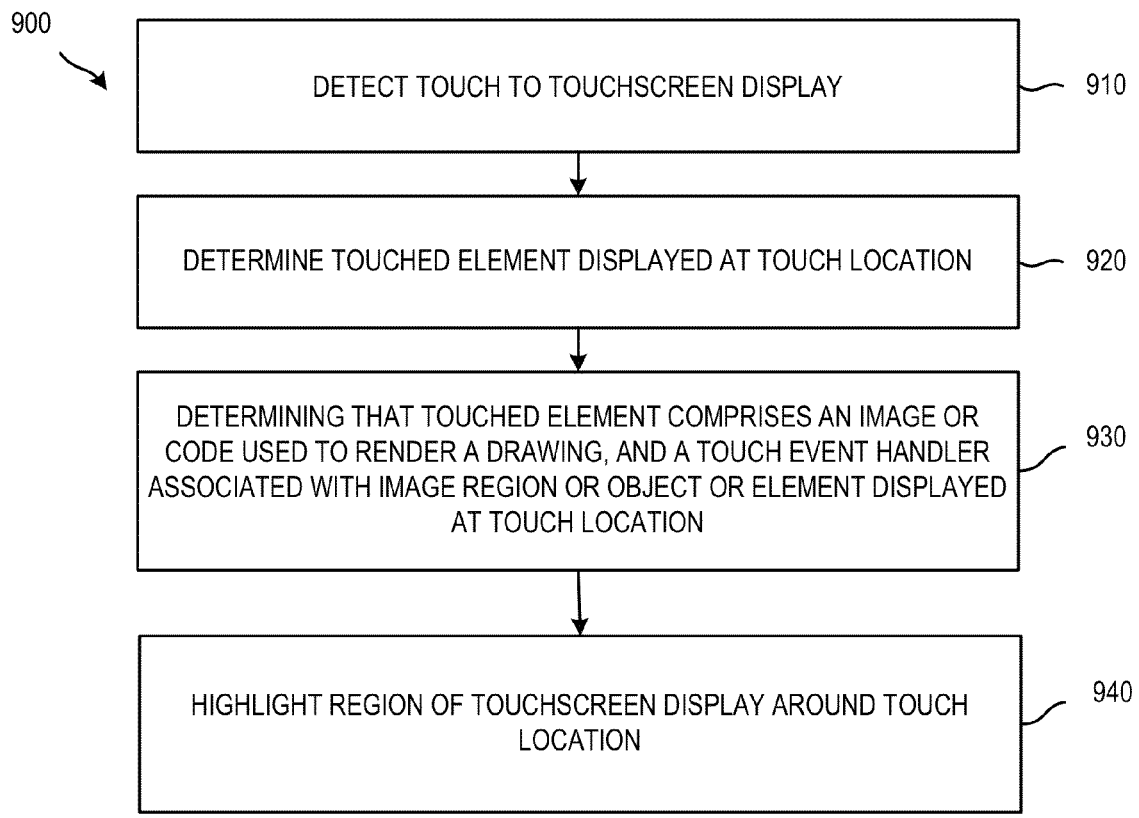
FIG. 9 is a flowchart of a second exemplary method of highlighting tappable web page elements on a touchscreen display.

FIG. 9 is a flowchart of a second exemplary method 900 of highlighting tappable web page elements displayed on a touchscreen display. The method 900 can be performed by a web browser executing on a tablet mobile computing device and displaying a web page containing the Mt. Rushmore image map element shown in FIG. 7. At 910, a touch to the touchscreen display at a touch location is detected. In the example, a touch to the touchscreen display is detected at a touch location at which Abraham Lincoln's head is displayed. At 920, a touched element from a plurality of elements of a web page displayed on the touchscreen display is determined to be displayed on the touchscreen display at the touch location. In the example, the image map element containing the Mt. Rushmore image is determined to be the touched element. At 930, it is determined that the touched element comprises an image or code used by a web browser to render a drawing, and at least one touch event handler associated with a region of the image or drawing, or an object or element within the touched element displayed at the touch location. In the example, the touched element is determined to be an image map element with a touch event handler associated with a region of the image that includes Abraham Lincoln's head. At 940, a region of the touchscreen display around the touch location is highlighted. In the example, a circular region of the tablet touchscreen display around President Lincoln's head is highlighted. In some embodiments of method 900, the touched element can be an image map element, an SVG element or a canvas element.

Figure 10:
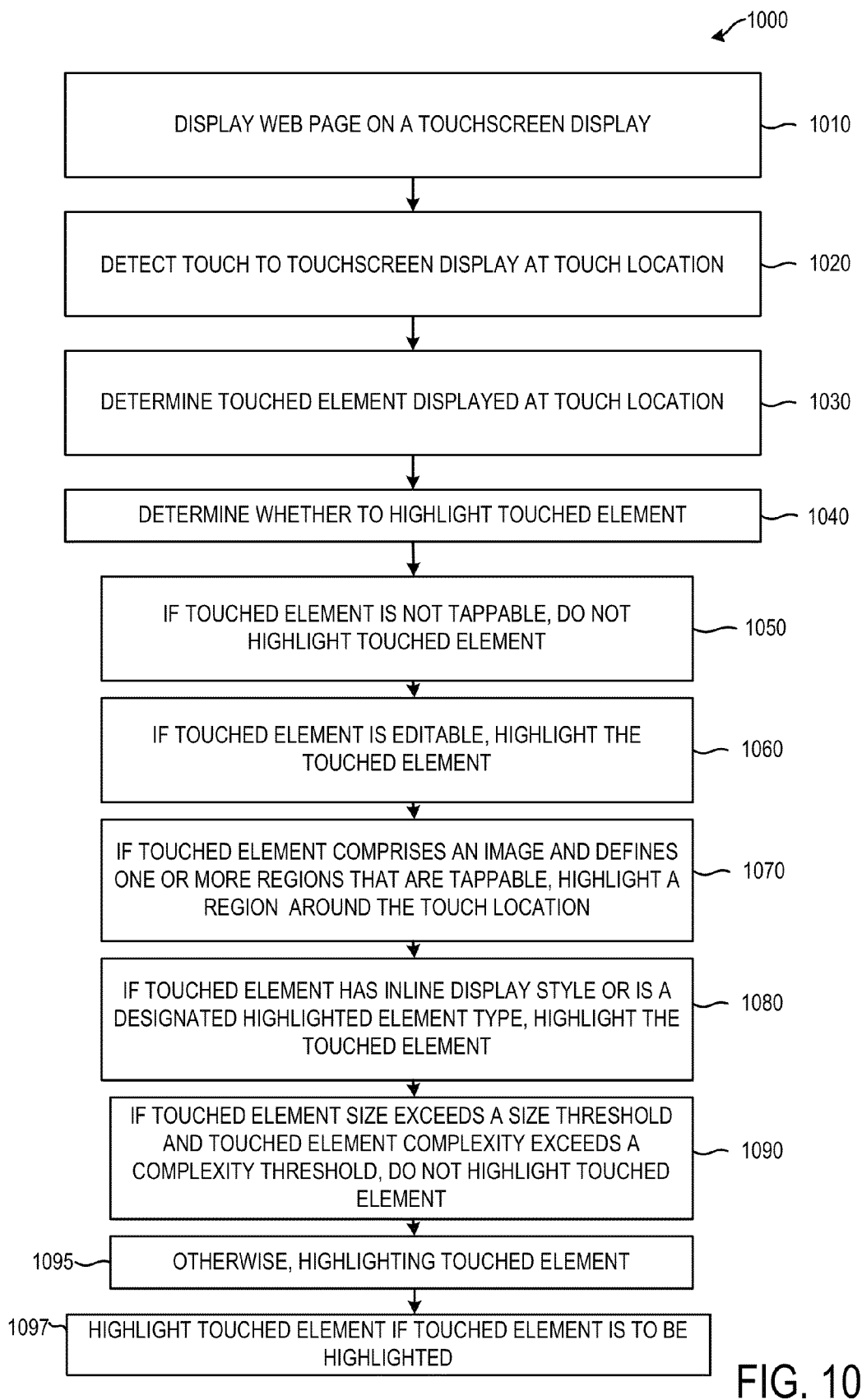
FIG. 10 is a flowchart of a third exemplary method of highlighting tappable web page elements on a touchscreen display.

FIG. 10 is a flowchart of a third exemplary method 1000 of highlighting tappable web page elements displayed on a touchscreen display. The method 1000 can be performed by a web browser executing on the smartphone 400 and displaying the web page 410, the web page 410 comprising element 435, which is a paragraph (<p>) element containing the text of the first article, having a height of 500 pixels and a width of 400 pixels, and containing more than 200 characters. The element 435 is part of a container element having a touch event handler. The size threshold is 300 pixels in height and 300 pixels in width, and the complexity threshold is 200 characters.

At 1010, a web page is displayed on a touchscreen display. The web page comprises a plurality of elements. In the example, the smartphone 400 displays the web page 410 on the touchscreen display 420. At 1020, a touch to the touchscreen display 420 is detected at a touch location. In the example, a touch is detected at a touch location within the region of the touchscreen display 420 where the element 435 is displayed and outside of the region where the element 437 is displayed. At 1030, a touched element from the plurality of elements is determined to be displayed on the touchscreen display 420 at the touch location. In the example, the element 435 is determined to be the touched element. At 1040, it is determined whether the touched element is to be highlighted, according to the actions 1050, 1060, 1070, 1080, 1090 and 1095.

At 1050, if the touched element is not tappable, it is determined that the touched element is not to be highlighted. In the example, the element 435 inherits the touch event handler of its container element, and the element 435 is tappable. Thus, the condition of 1050 is not satisfied and the method 1000 proceeds to 1060. At 1060, if the touched element is editable, it is determined that the touched element is to be highlighted. In the example, the element 435 is a paragraph element that is not editable. Thus, the condition in 1060 is not satisfied and the method 1000 proceeds to 1070. At 1070, if the touched element comprises an image and defines one or more regions that are tappable, it is determined that a region of the image around the touch location is to be highlighted. In the example, the paragraph element does not comprise an image and the method 1000 proceeds to 1080.

At 1080, if the touched element has an inline display style or the touched element type is a highlight element type, it is determined that the touched element is to be highlighted. In the example, the paragraph element does not have an inline display style and is not a designated highlight element type, and the method proceeds to 1090. At 1090, if a touched element size exceeds a size threshold and a touched element complexity exceeds a complexity threshold, it is determined that the touched element is not to be highlighted. In the example, the size and complexity of element 435 exceeds the size threshold and complexity threshold, the condition of 1090 is satisfied, and it is determined that element 435 is not to be highlighted. At 1095, if none of the conditions in 1050, 1060, 1070, 1080 and 1090 is satisfied, then the touched element is highlighted. In the example, this action is never reached as the condition of 1090 was satisfied. At 1097, the touched element is highlighted if it has been determined that the touched element is to be highlighted. In the example, the element 435 is not highlighted.

The highlighting techniques can be used in a variety of usage and computation scenarios, including highlighting processing on a client computing device and highlighting processing on a sever computer that can provide the highlighting techniques as part of a service offered to customers.

Any of the disclosed methods can be implemented as computer-executable instructions or a computer program product. The computer-executable instructions or computer program products as well as any data created and used during implementation of the disclosed embodiments can be stored on one or more computer-readable storage media (e.g., non-transitory computer-readable media, such as one or more optical media discs (such as DVDs and CDs) volatile memory components (such as DRAM or SRAM), or nonvolatile memory components (such as flash memory or hard drives)) and executed on a computer (e.g., any commercially available computer, including smart phones or other computing devices that include computing hardware). Computer-readable storage media does not include propagated signals. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it is to be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and are not set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A method of highlighting tappable web page elements on a touchscreen display, the method comprising:
    displaying at least a portion of a web page on the touchscreen display, the web page comprising a plurality of hierarchically arranged web page elements that inherit properties of ancestor elements;
    detecting a touch to the touchscreen display at a touch location;
    determining, from the plurality of elements, a touched element displayed on the touchscreen display at the touch location;
    determining whether the touched element is tappable, wherein determining whether the touched element is tappable comprises determining whether the touched element is intrinsically tappable due to its type, has a touch event handler or a mouse event handler associated with it, or because one of its ancestor elements is tappable;
    based on a number of characters and a number of tags in the touched element, determining a complexity of the touched element;
    determining whether the touched element is to be highlighted based at least on whether the touched element is tappable, a touched element size, and the touched element complexity, wherein the touched element is tappable but determined not to be highlighted based at least on the touched element size and the touched element complexity; and
    based on whether the touched element is determined to be highlighted, choosing between highlighting and not highlighting the touched element on the touchscreen display.

2. The method of claim 1, wherein the determining whether the touched element is to be highlighted is based at least on the touched element size.

3. The method of claim 2, wherein the touched element size comprises a touched element height.

4. The method of claim 2, wherein the touched element size comprises a touched element width.

5. The method of claim 1, wherein the determining whether the touched element is to be highlighted comprises determining that the touched element is not to be highlighted if the touched element size exceeds a size threshold and the touched element complexity exceeds a complexity threshold.

6. The method of claim 5, further comprising adjusting the size threshold and/or the complexity threshold in response to a change in a magnification factor of the web page.

7. The method of claim 5, wherein the size threshold and/or the complexity threshold is based on a size of the touchscreen display.

8. The method of claim 1, wherein the determining whether the touched element is to be highlighted is based at least in part on the touched element display style.

9. The method of claim 8, wherein the determining whether the touched element is to be highlighted comprises determining the touched element is to be highlighted if the touched element display style is an inline display style.

10. One or more computer-readable storage media storing computer-executable instructions for causing a computing device to perform a method of highlighting tappable web page elements displayed on a touchscreen display, the method comprising:
    displaying a web page on the touchscreen display, the web page comprising a plurality of elements;
    detecting a touch to the touchscreen display at a touch location;
    determining, from the plurality of elements, a touched element displayed at the touch location;
    based on a number of characters and a number of tags in the touched element, determining a touched element complexity;
    determining whether to highlight the touched element, the determining performed via a process comprising:
        if the touched element is not tappable, determining not to highlight the touched element;
        if the touched element is editable, determining to highlight the touched element;
        if the touched element comprises an image and defines one or more regions that are tappable, determining to highlight a region of the image around the touch location;
        if the touched element has an inline display style or a type of the touched element is a highlight element type, determining to highlight the touched element; and
        if a touched element size exceeds a size threshold and the touched element complexity exceeds a complexity threshold, determining not to highlight the touched element;
        wherein the size threshold and the complexity threshold are based on a display size and a display magnification factor;
        wherein the determining determines that the element is tappable, but based at least on the touch element size and the touched element complexity, the element is determined not to be highlighted; and
    highlighting or not highlighting the touched element according to the determining whether to highlight the touched element.

11. The one or more computer-readable storage media of claim 10, wherein the determining that the touched element comprises an image or code used by a web browser to render a drawing comprises determining whether the touched element is an image map element.

12. The one or more computer-readable storage media of claim 10, wherein the determining that the touched element comprises an image or code used by a web browser to render a drawing comprises determining whether the touched element is an SVG element.

13. The one or more computer-readable storage media of claim 10, further comprising adjusting the size threshold and/or the complexity threshold in response to a change in the display magnification factor of the web page.

14. One or more computer-readable storage media storing computer-executable instructions for causing a computing device to perform a method of highlighting tappable web page elements displayed on a touchscreen display, the method comprising:
- displaying at least a portion of a web page on the touchscreen display of the computing device, the web page comprising a plurality of hierarchically arranged web page elements that inherit properties of ancestor elements;
- detecting a touch to the touchscreen display at a touch location;
- determining, from the plurality of elements, a touched element displayed on the touchscreen display at the touch location;
- determining whether the touched element is tappable, wherein determining whether the touched element is tappable comprises determining whether the touched element is intrinsically tappable due to its type, has a touch event handler or a mouse event handler associated with it, or because one of its ancestor elements is tappable;
- based on a number of characters and a number of tags in the touched element, determining a complexity of the touched element;
- determining whether the touched element is to be highlighted based at least on whether the touched element is tappable, a touched element size, and the touched element complexity, wherein the touched element is tappable but determined not to be highlighted based at least on the touched element size and the touched element complexity; and
- based on whether the touched element is determined to be highlighted, choosing between highlighting and not highlighting the touched element on the touchscreen display.

15. One or more computer-readable storage media of claim 14, wherein the determining whether the touched element is to be highlighted is based at least on the touched element size.

16. One or more computer-readable storage media of claim 14, wherein the touched element size comprises a touched element height and a touched element width.

17. One or more computer-readable storage media of claim 14, wherein the determining whether the touched element is to be highlighted comprises determining that the touched element is not to be highlighted if the touched element size exceeds a size threshold and the touched element complexity exceeds a complexity threshold.

18. One or more computer-readable storage media of claim 17, further comprising adjusting the size threshold and/or the complexity threshold in response to a change in a magnification factor of the web page.

19. One or more computer-readable storage media of claim 17, wherein the size threshold and/or the complexity threshold is based on a size of the touchscreen display.

20. One or more computer-readable storage media of claim 14, wherein the determining whether the touched element is to be highlighted is based at least in part on the touched element display style.

21. One or more computer-readable storage media of claim 14, wherein the determining whether the touched element is to be highlighted comprises determining the touched element is to be highlighted if the touched element display style is an inline display style.

\* \* \* \* \*